(12) United States Patent
Wobben

(10) Patent No.: US 7,238,007 B2
(45) Date of Patent: Jul. 3, 2007

(54) ROTOR BLADE OF A WIND POWER INSTALLATION, COMPRISING A WARNING LIGHT

(76) Inventor: Aloys Wobben, Argestrasse 19, Aurich (DE) 26607

( * ) Notice: Subject to any disclaimer, the term of this patent is extended or adjusted under 35 U.S.C. 154(b) by 131 days.

(21) Appl. No.: 10/498,187

(22) PCT Filed: Dec. 6, 2002

(86) PCT No.: PCT/EP02/13845

§ 371 (c)(1),
(2), (4) Date: Nov. 19, 2004

(87) PCT Pub. No.: WO03/050412

PCT Pub. Date: Jun. 19, 2003

(65) Prior Publication Data

US 2005/0079052 A1  Apr. 14, 2005

(30) Foreign Application Priority Data

Dec. 8, 2001  (DE)  .............................. 101 60 360
Jun. 26, 2002  (DE)  .............................. 102 28 442

(51) Int. Cl.
 *F03D 11/00* (2006.01)
(52) U.S. Cl. .................. 416/5; 416/61; 416/146 R
(58) Field of Classification Search .............. 416/5, 416/61, 146 R; 415/118
See application file for complete search history.

(56) References Cited

U.S. PATENT DOCUMENTS 3,723,722 A * 3/1973 Van Iderstine et al. ..... 362/470
4,653,096 A * 3/1987 Yokoyama ................... 381/17
5,321,257 A   6/1994 Danisch ................. 250/227.16
6,641,366 B2 * 11/2003 Nordhoff ........................ 416/5

FOREIGN PATENT DOCUMENTS

| DE | 676 166 | 5/1939 |
|---|---|---|
| DE | 200 08 289 U1 | 8/2000 |
| DE | 200 15 183 U1 | 12/2000 |
| DE | 200 21 970 U1 | 4/2001 |
| DE | 201 01 375 U1 | 6/2001 |
| DE | 201 03 294 U1 | 9/2001 |
| GB | 2 093 617 A | 9/1982 |
| SE | 8206 718 | 11/1982 |
| WO | WO 01/86606 A1 | 11/2001 |

* cited by examiner

*Primary Examiner*—Ninh H. Nguyen
(74) *Attorney, Agent, or Firm*—Seed IP Law Group PLLC

(57) ABSTRACT

The object of the invention is to provide lighting for the rotor blade tips, which is more reliable than that proposed hitherto, wherein any damage which occurs is no longer so complicated and expensive to rectify as hitherto, but can be rectified extremely swiftly. A rotor blade of a wind power installation with a rotor blade connection to a hub of the wind power installation and a rotor blade tip at the end of the rotor blade, which is in opposite relationship to the rotor blade connection, characterized in that at least one light waveguide is laid from the rotor blade connection to the rotor blade tip. The light can be modified to be on only when the blade is at the top portion of the rotation, such as between the 9:00 and 3:00 positions, or the 10:00 and 2:00 positions.

9 Claims, 2 Drawing Sheets

ROTOR BLADE OF A WIND POWER INSTALLATION, COMPRISING A WARNING LIGHT

BACKGROUND OF THE INVENTION

1. Field of the Invention

Wind power installations with rotor blades of the most widely varying kinds have already long been known. It is also known that, in certain situations, the wind power installation has to be provided with a hazard light in order to draw the attention of air traffic in the region of the wind power installation to the existence of the installation, in good time. For the above-indicated purpose it is also known for the rotor blades to be provided with mostly red warning coats of paint so that it is possible to prevent an aircraft, in particular a military aircraft, from colliding with a wind power installation or the rotor thereof.

2. Description of the Related Art

The proposal has also already been put forward, for improving the warning to air traffic, to use incandescent lamps or other lighting means at the tips of the rotor blades, besides coloring the rotor blades with signalling colors, the lamps or lighting means then being switched on at night so that they can be readily seen by air traffic. The disadvantage of incandescent lamps or other lighting means however is that they are only of limited durability and the costs of replacing worn-out lighting means is not reasonably related to the benefit. Thus the costs of replacing lighting means at a rotor blade tip can be several thousand DM, because not only does the wind power installation have to be stopped, which is very expensive, but also the service personnel have to be lifted to the rotor blade tip by means of a crane arrangement from the pylon of the wind power installation or from the ground in front of the wind power installation.

That expenditure is grossly mismatched with the actual technical failure.

As a solution in this respect, it has therefore also already been proposed that the lighting device at the rotor blade tip may be of a redundant nature. However even such a concept cannot always ensure that the lighting arrangement does not suffer from failure, in which respect the reasons for failure of the lighting means may vary greatly, either that the lighting means at the rotor blade tip are mechanically damaged (hit by particles, hail, rain etc) or the respective electrical contacts are interrupted, or also other reasons.

BRIEF SUMMARY OF THE INVENTION

The object of the invention is to avoid the above-indicated disadvantages and to provide lighting for the rotor blade tips, which is more reliable than that proposed hitherto, wherein any damage which occurs is no longer so complicated and expensive to rectify as hitherto, but can be rectified extremely swiftly.

That object is attained by the invention having the features set forth in claim 1. Advantageous developments are set forth in the appendant claims.

The invention is based on the notion of moving all the lighting means from the tip region (rotor blade tip) of the rotor blades into the region in the proximity of the hub, for example the hub of the rotor itself. If then a lighting means fails, it can be replaced by the service personnel very easily and in a very uncomplicated fashion.

While the lighting means, that is to say a light-producing device such as for example a laser or a light emitting diode or a plurality thereof is disposed in the pod of the wind power installation, the light produced is fed into a glass fiber cable (light waveguide, light guide) which in turn is laid into the tip region of the rotor blade and is there arranged at the surface of the rotor blade in such a way that the light can readily issue.

Even if, and this is highly improbable, the end region of the light waveguide in the blade tip region should suffer from damage, that does not result in failure of the entire light waveguide, but rather it will continue to emit its light which is guided through it. As however there are no electrical elements whatsoever in the blade tip region, the light waveguides are highly protected.

Supplemental to the foregoing or also alternatively the invention also proposes using the light guides for implementing possible stress and load measurements on the rotor blade itself.

In that respect reference may be made generally to the following: when light is introduced into a light guide, that light is reflected in the interior of the light guide at corresponding edges and is propagated to the exit at the light guide end.

From the quotient of the amount of light introduced to the amount of light issuing, it is also possible to assume a value in respect of quality, in which case quality in the optimum situation is one, when therefore the amount of light which is fed into the light guide corresponds to the intensity (lumens) of the amount of light at the issuing end of the light guide.

The quality of light guides however depends not just on the material of the light guide or the nature of the light introduced, but also on the way in which the light guide is laid. If for example the light guide is laid along a straight line, quality is generally greater than if the light guide is laid in various geometries involving winding serpentine configurations or arcs or other radii of curvature.

Movement of the light guide transversely to the direction in which it extends also means that propagation of the light in the interior of the light guide is in part limited, which has the result that the level of quality overall falls.

In accordance with the invention, in case of a rotor blade of a wind power installation, it is also possible to make use of that last-mentioned effect for optically/electrically measuring the flexing of the rotor blade, insofar as a light guide is passed virtually as a loop, beginning from the rotor blade hub by way of a given guide configuration in the rotor blade by way of the rotor blade tip and back to the hub again. Then, arranged at the issuing end of the light guide is a suitable detector which measures the intensity of the issuing light and that issuing amount of light is constantly related to the amount of light passing into the light guide, by way of a suitable processing device (processor).

When now with an increasing loading on the rotor blade (rising wind speed), the rotor blade progressively increasingly flexes, that automatically results in worsened or altered quality, and a measurement in respect of the mechanical loading on the rotor blade can also be deduced from the specific level of quality.

Therefore, with the above-indicated variant of the invention, it is also possible to establish the loading on a rotor blade not only integrally at the hub, the rotor blade root, but also at individual points, in particular also in the rotor blade tip region, and any overstretching which may occur of the rotor blade tip by virtue of a gust or another event can be very quickly established, and this can also be used at the same time to possibly stop the wind power installation or implement adjustment of the rotor blade angle (pitch) in order to avoid the unwanted overstretch situation, because such overload situations can usually result in a considerable reduction in the service life of the rotor blades and thus the entire wind power installation.

It will be self-evident that the light guides can be passed by way of the most widely varying geometries in the rotor blade itself or beneath the uppermost layer of the rotor blade or on the rotor blade. It is not only possible for the light guides to be directly passed from the rotor blade root to the rotor blade tip and back again on one side or on different sides of the rotor blade, but it is also possible for the light guides to be wound in a spiral configuration around the entire rotor blade from the rotor blade root to the rotor blade tip and back, or it is also possible for various bundles of light waveguides to be laid by way of widely varying geometrical configurations in respect of the rotor blade (or in the rotor blade itself).

The more a light guide is moved out of its lengthwise direction upon flexing of the rotor blade, the correspondingly greater will the drop in the level of quality generally also be, and by clever measurement and interchange of the outgoing and return lines, it is also possible under some circumstances to accurately establish where unwanted overstretching of a rotor blade takes place or has taken place.

The advantage of laying the light waveguides in or on the rotor blade is also that laying them in that way can already be implemented during production of the rotor blades and the light guides themselves are usually extremely robust and, as the light guides themselves are electrically non-conductive, they are also accordingly already well protected from possible disturbances due to a lightening strike on the rotor of the wind power installation.

In addition possible overloading of the rotor blade can be measured with the light guides (or waveguides) markedly more quickly than for example with a strain gauge strip (SGS) or another measuring device which measures the mechanical loading on a rotor blade integrally in the hub region or root region of the rotor blade. As an electrical signal about the intensity of the issuing light is also equally available by way of the light detector at the exit end of the light waveguide, that electrical signal can also be directly passed to a remote monitoring station of the wind power installation and can there be suitably evaluated and can be used for very swift intervention in the installation if the installation does not already have automatic control devices which, when the level of quality falls below a given value, automatically implement installation control or modification resulting in a relief of load on the rotor blades.

When the light waveguides are laid as a rotor blade tip lighting arrangement (tip lighting arrangement), it may also be appropriate for the tip lighting arrangement not to be switched on over the entire rotational extent of the rotor, but only when the respective rotor blade is in a region between the nine o'clock and three o'clock positions (the rotor blade rotating in the clockwise direction) or preferably only in the region between the ten o'clock and two o'clock positions.

It is also possible, by virtue of feeding in light by means of diodes, to feed not just monochrome white light into the light waveguides but also light of varying colors, and the light can also be directly emitted in various directions by virtue of the appropriate issue of the light waveguides at the rotor blade tip, in which case, to increase the level of intensity, the ends of the light waveguide are provided with a suitable lens which in turn at the same time once again also protects the corresponding end of the light waveguide.

BRIEF DESCRIPTION OF THE SEVERAL VIEWS OF THE DRAWINGS

The invention is described hereinafter by means of a specific embodiment. In the drawing:

FIG. 1 shows a rotor blade 10 with a light waveguide 14 which is laid thereon (or therein) and which is laid in a meander configuration in the region of the rotor blade tip 15. A light emitting diode 16 is arranged at a connection of the light waveguide 14 and a corresponding light receiving diode 18 is arranged at the other connection. Light is fed into the light waveguide by the light emitting diode and the receiving diode 18 receives the light which has passed through the light guide.

Before now the wind power installation is brought into operation and the rotor blade is completely non-deflected (that is to say is no longer deformed by the wind), reference measurements are now implemented, the amount of received light being measured in the light receiving unit 18 in that situation. The quantitative proportion of light can usually also be expressed as a percentage value, the percentage value always being below 100%. With a measured value of 100%, the total light emitted by the sender unit 16 would have to arrive in the receiving unit 18 through the light waveguide 14 and the level of quality would then be 1.

When now the wind power installation is brought into operation, that also has the result, by virtue of the wind and dynamic pressure, that the entire rotor blade is deflected, in particular in the tip region. At the same time that also involves a change in the original position of the light waveguides, and that usually also results in a different reflection path within the light waveguide. The consequence of that is usually a reduction in the light yield with respect to the reference condition, and that lesser light yield is measured in the receiving unit 18.

Accordingly the quantitative light measurement (light modulation measurement) in the receiving unit 18 (or light modulation measurement) can also ascertain a magnitude in respect of the deflection of the rotor blade as, upon deflection of the blade, the quality is below the level of quality in the reference condition.

If certain overstretching effects in respect of a rotor blade are unwanted, that is to say the level of quality falls below a predetermined value, then that can also be monitored by means of the invention and if necessary the measured data can also be used to shut down the entire wind power installation for its own protection.

The above-described alternative according to the invention also has the advantage that, in the event of a hairline crack which may possibly be present in the rotor blade of the wind power installation, with the hairline crack extending substantially transversely with respect to the light guide, the light guide can very quickly be torn away so that the entire transmission of light is then not only disturbed but can also collapse. A light guide can be torn away in that fashion because the light guides are usually designed to be extremely porous, in respect of their lengthwise extent, and are only slightly elastic. If now transmission of light through the light guide is sensitively disturbed by a hairline crack, the entire installation can be stopped and the rotor blade can be very closely investigated for possible hairline cracks at an early stage.

Figure 1:
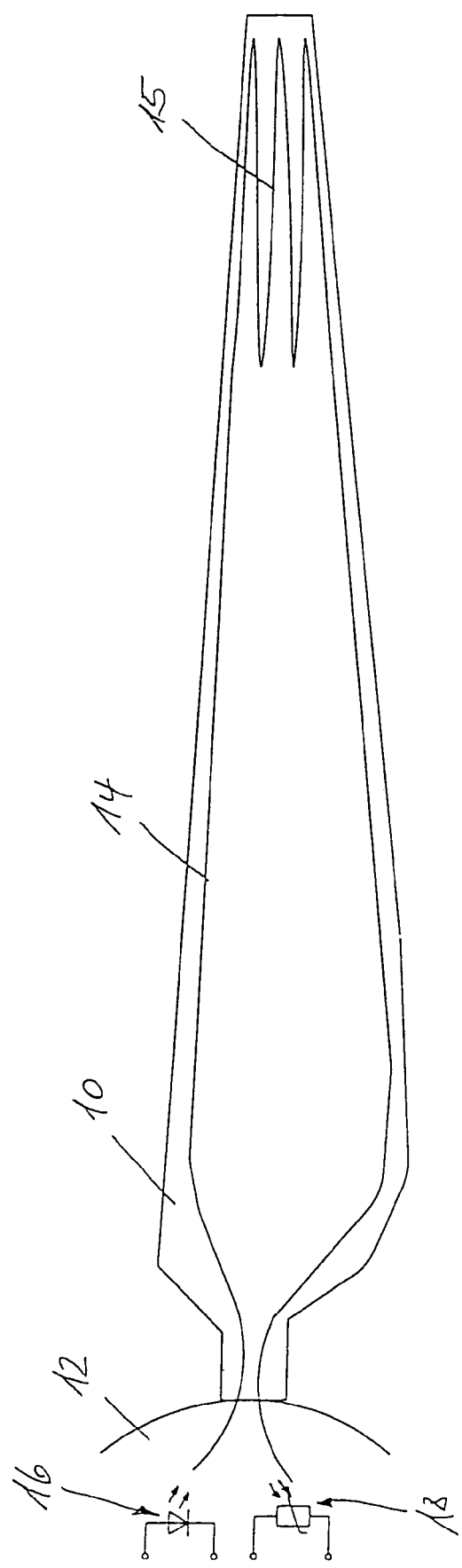
FIG. 1 shows a first embodiment of a rotor blade according to the invention.

FIG. 1 does not show the arrangement for further processing of the measured light. This can involve conventional arrangements which produce an electrical signal from the measured amount of light and the corresponding electrical signal is then further processed in a processor or another processing apparatus in such a way that the quantitative value of the received light is ascertained, which is then also possibly related to the amount of light which has passed into the light guide. The value in respect of quality can be deduced directly from that difference value (amount of emitted light/amount of received light). It is appropriate to provide in a suitable memory a table for given levels of quality, wherein, when the ascertained quality falls below or rises above the given levels of quality, suitably desired measures can then be taken in relation to the wind power installation, for example the installation can be shut down.

Figure 2:
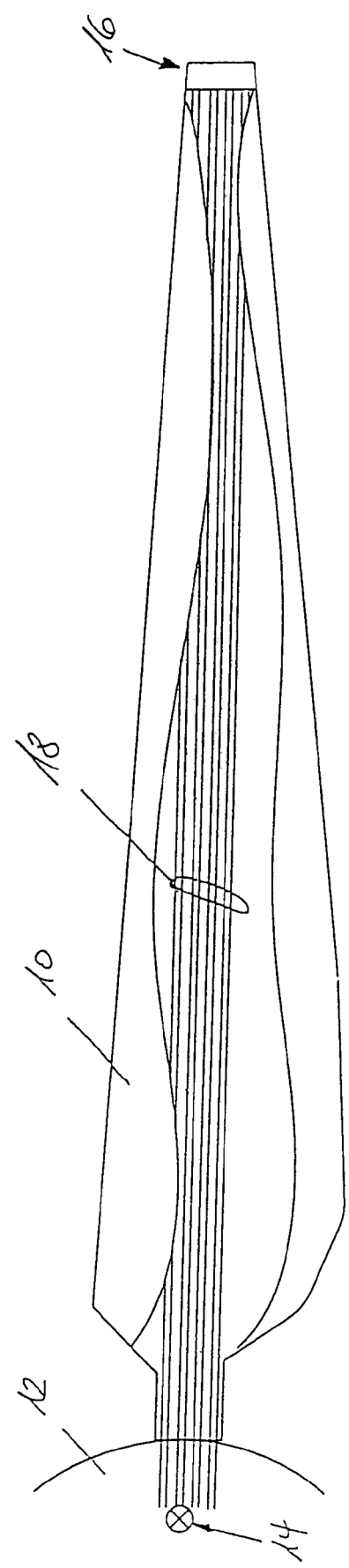
FIG. 2 shows an alternative further embodiment of a rotor blade.

Alternatively or supplemental to the structure shown in FIG. 1 FIG. 2 shows a bundle of light waveguides which are laid from the hub of the rotor blade (rotor blade root) to the rotor blade tip. In the hub region, light is fed into the light waveguides by means of a light 14 and in the tip region the light issues from the light waveguides so that the tip region is well lit at least at night and thus the attention of air traffic is drawn to the wind power installation.

It will be appreciated that the above-mentioned alternatives can also be combined with each other so that, besides an illuminated tip, it is also possible to implement monitoring of the light deflection of a rotor blade. The light 14 can in that case also represent a light emitting diode.

It will be appreciated that switching-on of the lights 14 and 16 can be made dependent on the respective time of day, darkness or the respective position of an individual rotor blade, for example the lights can be switched on when a rotor blade is in a 10.00 hours to 12.00 hours/14.00 hours position.

That measure has the advantage that on the one hand the lighting means are conserved and in addition the lighting means are lit up only in a rotor blade position where the rotor blade is still visible. In addition, pollution in respect of the environment around the wind power installation is minimized, when the lighting means are switched on.

It is apparent that the described tip lighting arrangement by means of a light waveguide can also be embodied by way of other lighting means, for example LEDs which are then supplied with power by way of suitable cables.

The control device for controlling the lighting means is preferably coupled to the wind power installation control system so that the lighting means can be switched on in dependence on rotor blade position.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A rotor blade of a wind power installation having a rotor blade connection for connection to a hub of the rotor of a wind power installation and a blade tip which is at the end of the rotor blade, which is in opposite relationship to the rotor blade, characterized in that a light guide is laid over the length of the rotor blade, wherein light enters at the entry end of the light guide and the light issues again at the exit end of the light guide, and there is provided a detector which detects the quantity of the issuing light, and that the detector is connected to an evaluation arrangement which evaluates the amount of the entering and issuing light, and characterized in that the evaluation arrangement is connected to a control arrangement of the wind power installation and the wind power installation is switched off if the amount of light issuing from the light guide falls below a predetermined value.

2. A rotor blade according to claim 1 characterized in that a plurality of light waveguides are laid from the rotor blade connection to the rotor blade tip.

3. The wind power installation having a rotor blade according to claim 1 characterized in that there are provided control means for switching-on of the lighting means is controlled in dependence on the position of an individual rotor blade, and that lighting means are switched on when the rotor blade in question is in a region between a 10.00 hours and a 14.00 hours position.

4. The wind power installation according to claim 1 in which the lighting is switched on when the rotor blade is between the 9:00 and 3:00 position on the upper part of the clock and is off at other positions.

5. A rotor blade of a wind power installation with a rotor blade connection to a hub of the wind power installation and a rotor blade tip at the end of the rotor blade, which is in opposite relationship to the rotor blade connection, comprising:
at least one first light waveguide laid from the rotor blade connection to the rotor blade tip, the light waveguide terminates in the region of the rotor blade tip at the surface of the rotor blade;
a lighting means, by means of which light is fed into the light waveguide and the light visibly issues again at the blade tip, and that light is then fed into the light waveguide and the light visibly issues again at the blade tip when the rotor blade in question is between the 9.00 hours position and the 15.00 hours position;
at least one second light waveguide laid over the length of the rotor blade, wherein light enters an entry end of the second light waveguide and exits from an exit end of the second light waveguide;
a detector configured to measure an amount of light exiting the second light waveguide; and
an evaluation arrangement that evaluates rotor blade stress based on the amount of light exiting the second light wave guide.

6. The wind power installation according to claim 5 wherein the evaluation arrangement is connected to a control arrangement such that the wind power installation is switched off if the amount of light exiting from the second light waveguide falls below a predetermined value.

7. A rotor blade of a wind power installation with a rotor blade connection to a hub of the wind power installation and a rotor blade tip at the end of the rotor blade, which is in opposite relationship to the rotor blade connection, characterized in that at least one first light waveguide is laid from the rotor blade connection to the rotor blade tip, the first light waveguide terminates in the region of the rotor blade tip at the surface of the rotor blade, and wherein there are provided lighting means, by means of which light is fed into the first light waveguide and the light visibly issues again at the blade tip, and that light is then fed into the first light waveguide and the light visibly issues again at the blade tip, the lighting being switched on when the rotor blade is between the 10:00 and 2:00 positions on the upper part of the clock and is off at other times so that only a single rotor blade is lit at the same time in a 3 blade system.

8. A rotor blade of a wind power installation having a rotor blade connection for connection to a hub of the rotor of a wind power installation and a blade tip which is at the end of the rotor blade, which is in opposite relationship to the rotor blade, characterized in that a light guide is laid over the length of the rotor blade, wherein light enters at the entry end of the light guide and the light issues again at the exit end of the light guide, and there is provided a detector which detects the quantity of the issuing light, and that the detector is connected to an evaluation arrangement which evaluates the amount of the entering and issuing light, the evaluation arrangement being connected to a control arrangement of the wind power installation such that the wind power installation is switched off if the amount of light issuing from the light guide falls below a predetermined value.

9. A wind power installation having a rotor comprising: a plurality of rotor blades which has means for lighting the tips of the rotor blades, wherein the lighting of the rotor blade tips is switched on when the rotor blade is between the 10:00 and 2:00 positions on the upper part of the clock and is off at other times so that only a single rotor blade is lit at the same time in a 3 blade system.

* * * * *